(12) United States Patent
Kim et al.

(10) Patent No.: US 7,980,644 B2
(45) Date of Patent: Jul. 19, 2011

(54) DAMPER AND HOME-BAR DOOR APPARATUS FOR REFRIGERATOR USING THE SAME

(75) Inventors: Ung-Su Kim, Gimhae (KR); Won-Ik Jo, Busan (KR)

(73) Assignee: LG Electronics Inc., Seoul (KR)

( * ) Notice: Subject to any disclaimer, the term of this patent is extended or adjusted under 35 U.S.C. 154(b) by 622 days.

(21) Appl. No.: 12/067,791

(22) PCT Filed: Sep. 21, 2006

(86) PCT No.: PCT/KR2006/003758
§ 371 (c)(1),
(2), (4) Date: Mar. 21, 2008

(87) PCT Pub. No.: WO2007/035049
PCT Pub. Date: Mar. 29, 2007

(65) Prior Publication Data
US 2008/0252191 A1    Oct. 16, 2008

(30) Foreign Application Priority Data

Sep. 23, 2005 (KR) .................. 10-2005-0088937
Mar. 17, 2006 (KR) .................. 10-2006-0024955

(51) Int. Cl.
*A47B 96/00* (2006.01)
(52) U.S. Cl. .................................................. 312/405.1
(58) Field of Classification Search ........ 16/54; 49/386, 49/387; 312/405, 405.1, 321.5, 327, 328, 312/292, 319.2; 62/265, 441, 407, 408; 267/113
See application file for complete search history.

(56) References Cited

U.S. PATENT DOCUMENTS

| | | | | |
|---|---|---|---|---|
| 5,109,571 A * | 5/1992 | Ohshima et al. | ............... | 16/307 |
| 5,419,013 A * | 5/1995 | Hsiao | ............... | 16/319 |
| 6,055,823 A * | 5/2000 | Baker et al. | ............... | 62/265 |
| 7,059,693 B2 * | 6/2006 | Park | ............... | 312/405.1 |
| 7,360,278 B2 * | 4/2008 | Jang et al. | ............... | 16/357 |
| 7,484,266 B1 * | 2/2009 | Yang | ............... | 16/54 |
| 7,596,830 B2 * | 10/2009 | Yin et al. | ............... | 16/303 |
| 2004/0178710 A1 * | 9/2004 | Kim et al. | ............... | 312/405 |
| 2006/0168890 A1 * | 8/2006 | Cho | ............... | 49/193 |
| 2006/0226750 A1 * | 10/2006 | Lee et al. | ............... | 312/405.1 |
| 2006/0226751 A1 * | 10/2006 | Park | ............... | 312/405.1 |

(Continued)

FOREIGN PATENT DOCUMENTS

| KR | 20-1999-008691 A | 3/1999 |
|---|---|---|
| KR | 20-1999-0031097 A | 7/1999 |
| KR | 20-0307805 A | 3/2003 |

(Continued)

*Primary Examiner* — Janet M Wilkens
(74) *Attorney, Agent, or Firm* — Birch, Stewart, Kolasch & Birch, LLP

(57) ABSTRACT

A home-bar door apparatus includes a home-bar door that selectively opens or closes an opening formed in a home-bar frame and has rotational shafts protruding at both sides of a lower portion thereof and a catching step formed along a lower end thereof, dampers that are installed on a rear face of the home-bar frame and control an opening/closing speed of the home-bar door by receiving the rotational shafts of the home-bar door therein so that the rotational shafts of the home-bar door can be relatively rotated, and a stop rib that is formed laterally along a lower end of a groove formed around a periphery of the opening and has stopping steps formed at positions corresponding to both ends of a catching step of the home-bar door so that the catching step can be caught by the stopping steps.

17 Claims, 12 Drawing Sheets

U.S. PATENT DOCUMENTS

| | | | | |
|---|---|---|---|---|
| 2008/0238279 | A1* | 10/2008 | Jang | 312/405 |
| 2008/0246380 | A1* | 10/2008 | Gwak | 312/405 |
| 2009/0261701 | A1* | 10/2009 | Yun et al. | 312/405 |
| 2010/0084956 | A1* | 4/2010 | Kim et al. | 312/405.1 |

FOREIGN PATENT DOCUMENTS

| | | |
|---|---|---|
| KR | 10-2004-0046467 A | 6/2004 |
| KR | 10-2004-0080070 A | 9/2004 |
| WO | 2009078676 * | 6/2009 |

* cited by examiner

[Figure 1]
PRIOR ART
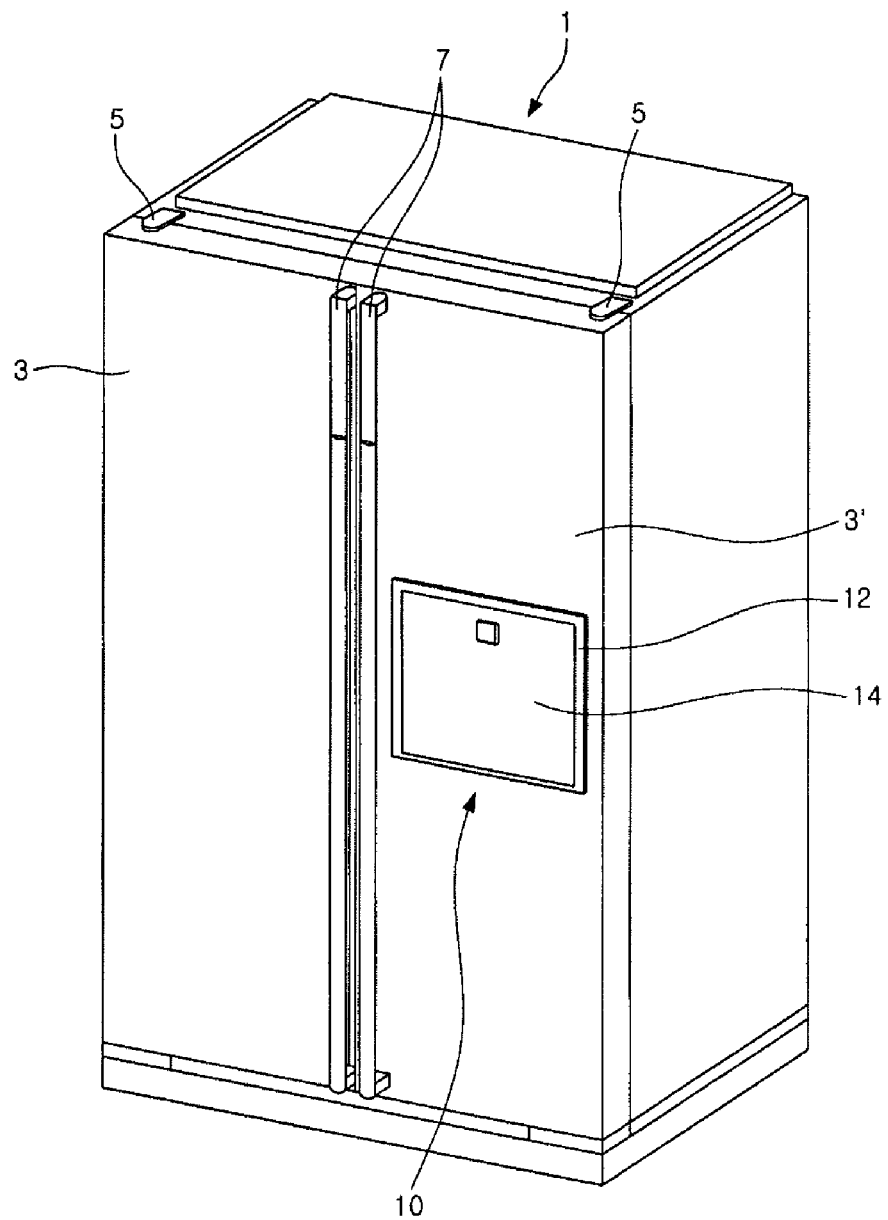

[Figure 2]
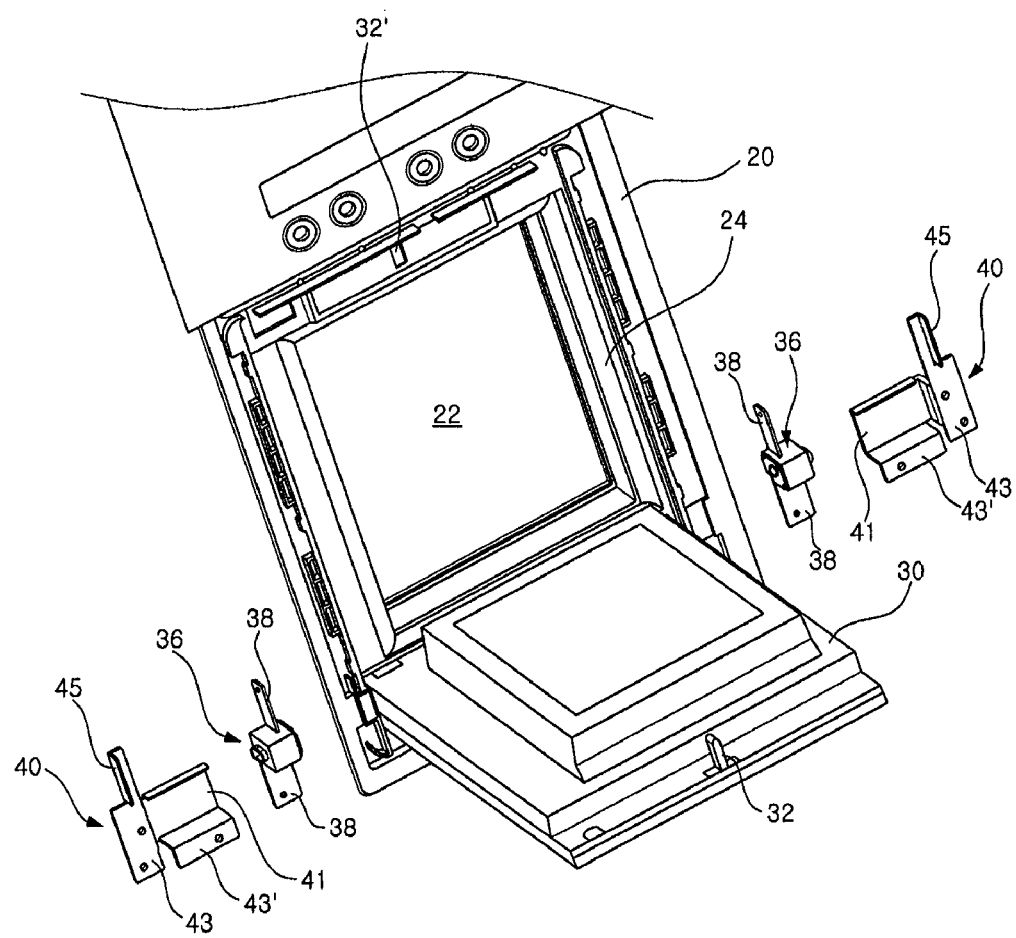

[Figure 3]
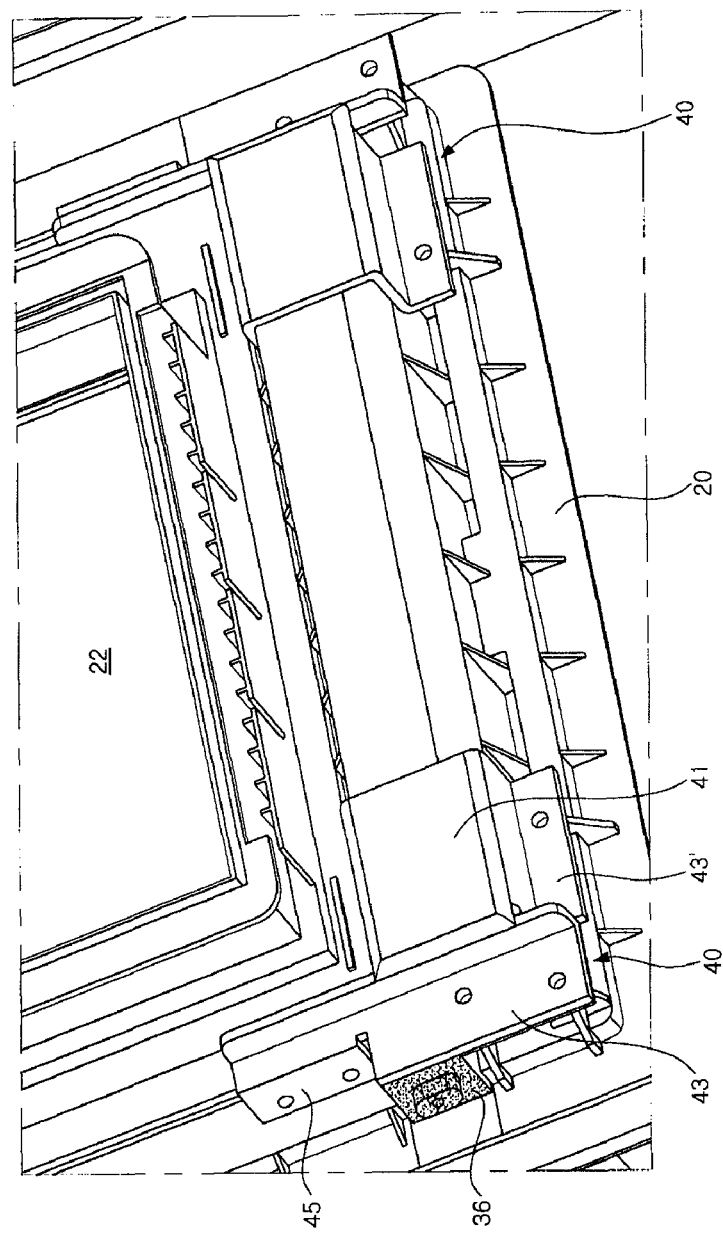

[Figure 4]
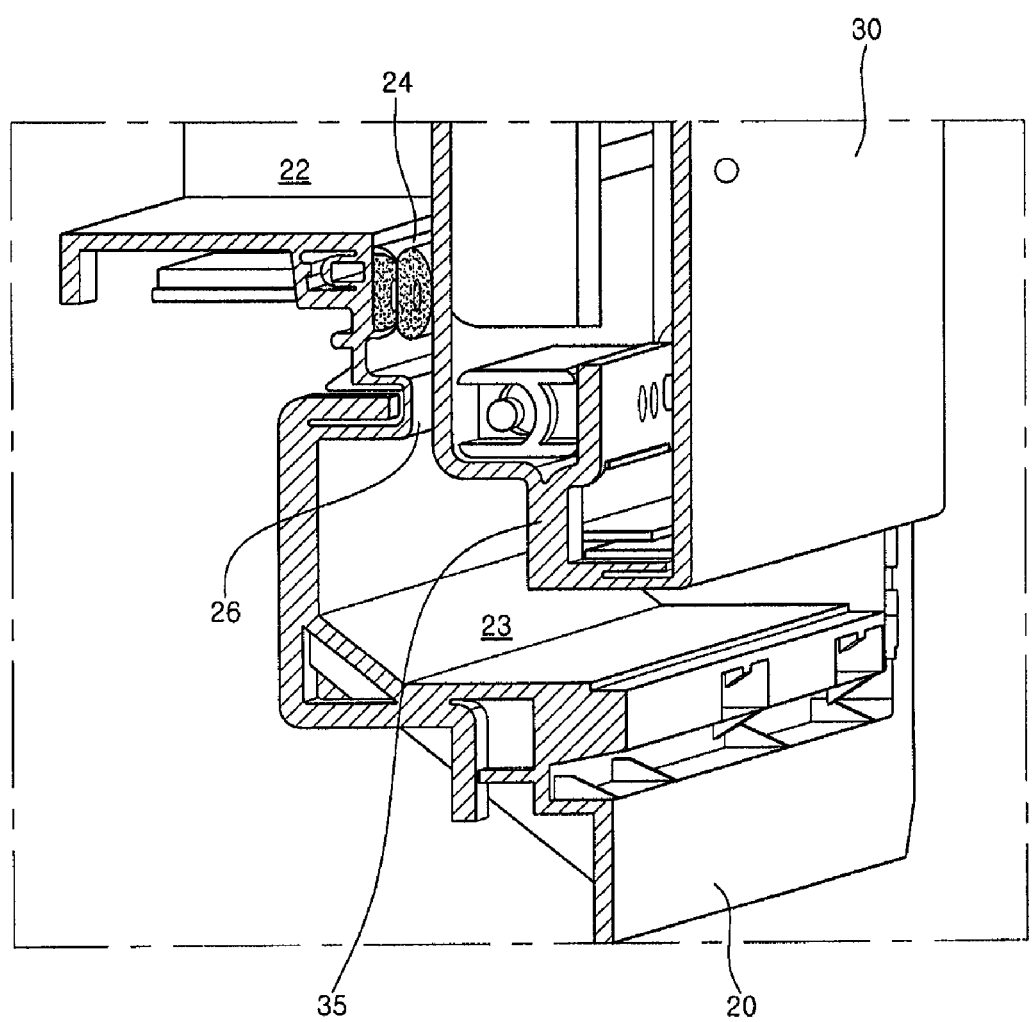

[Figure 5]
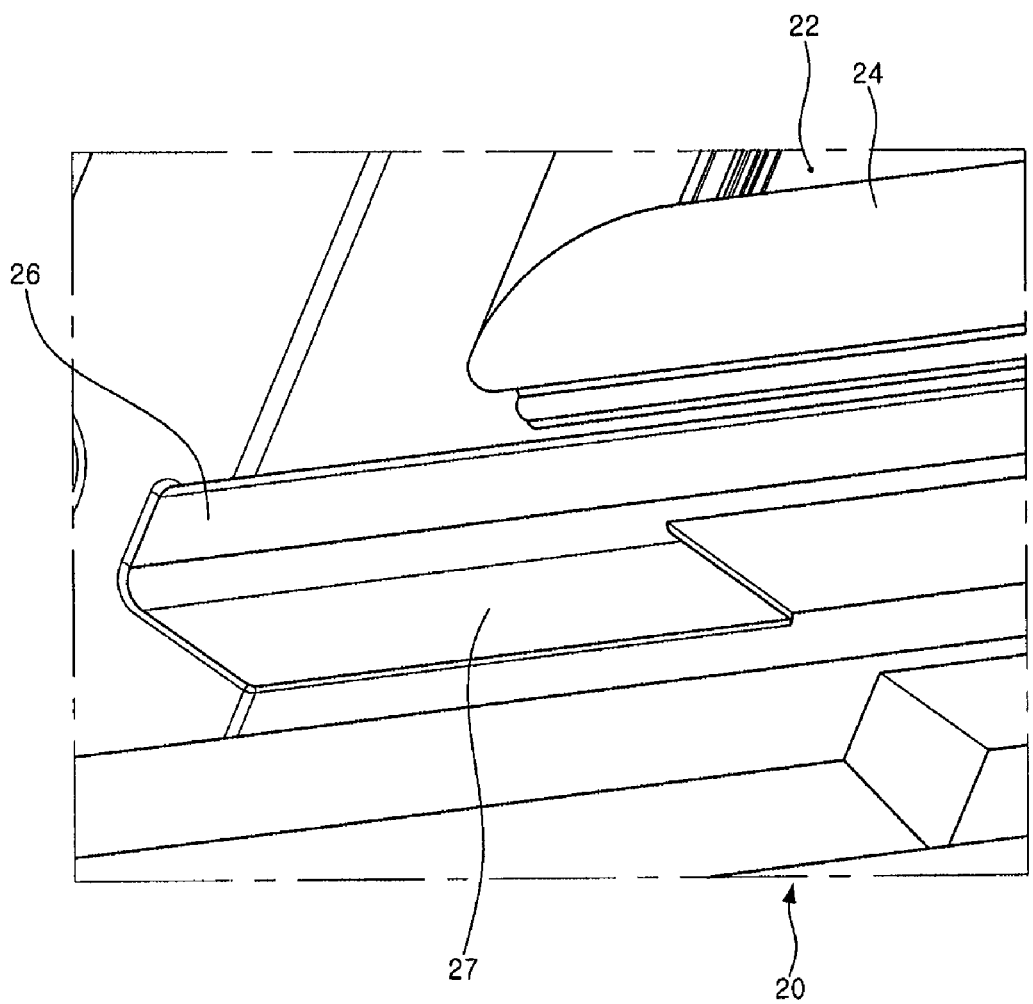

[Figure 6]
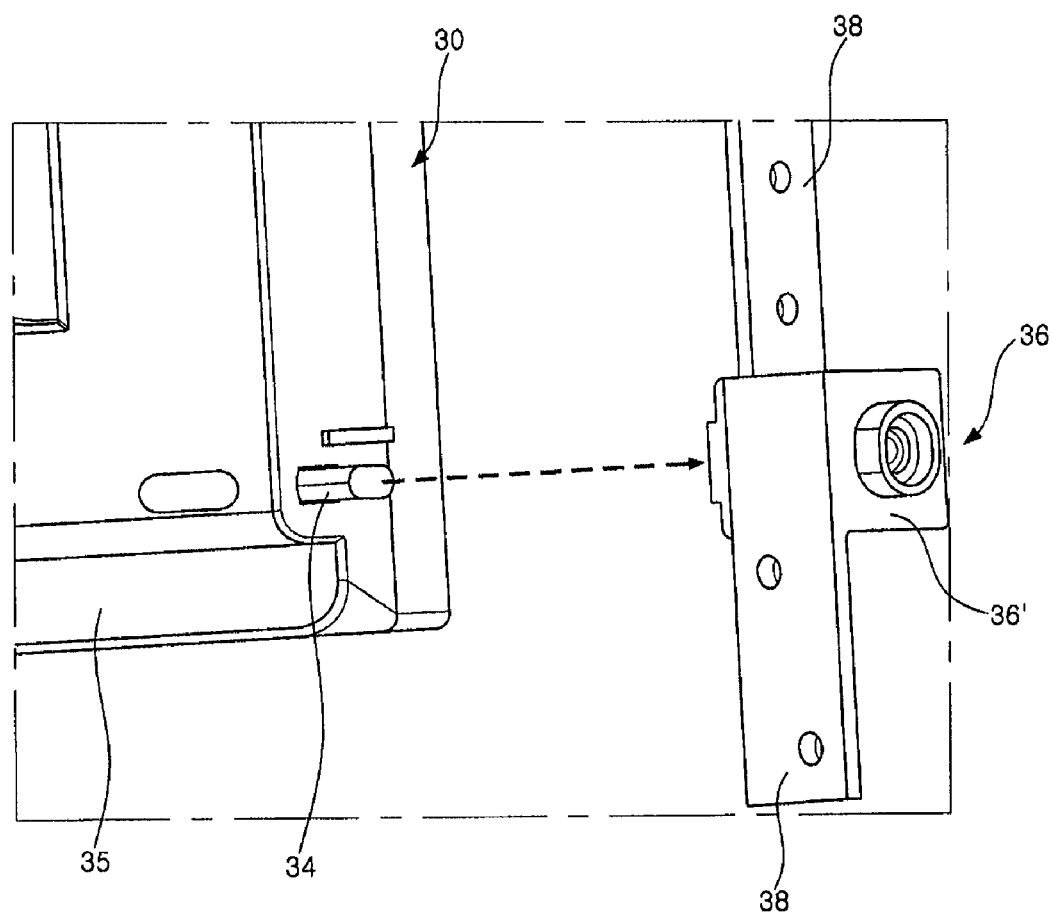

[Figure 7]
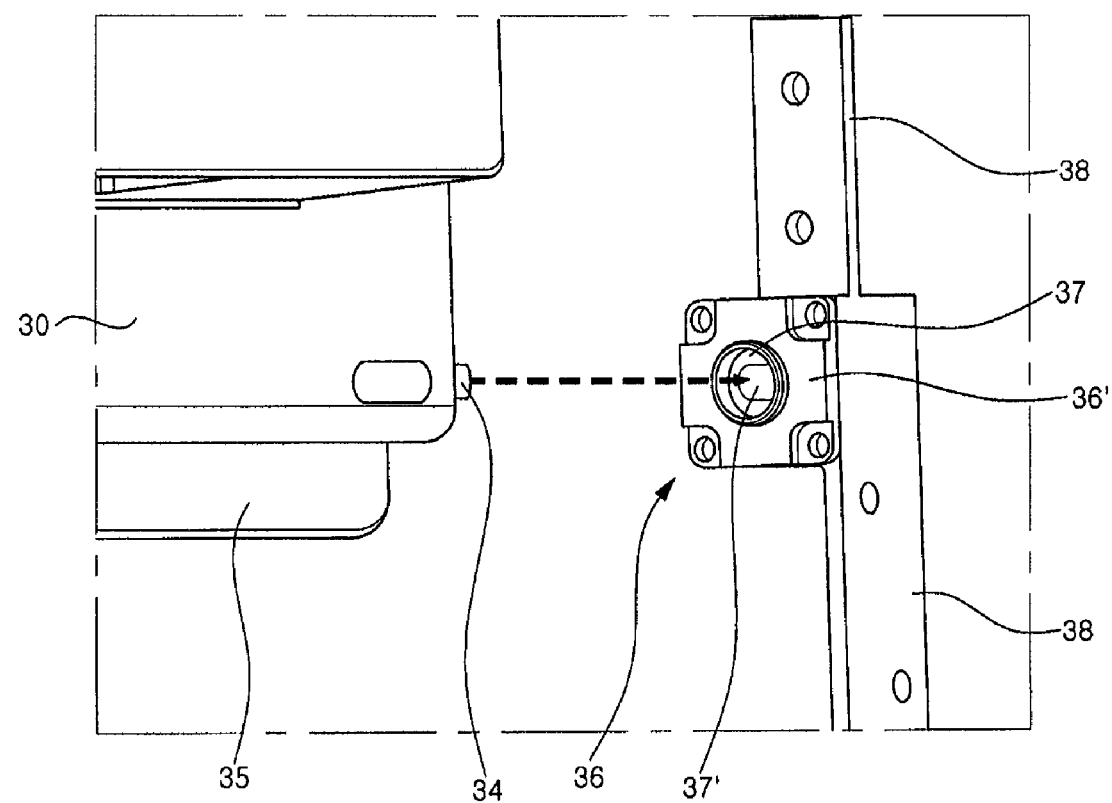

[Figure 8]
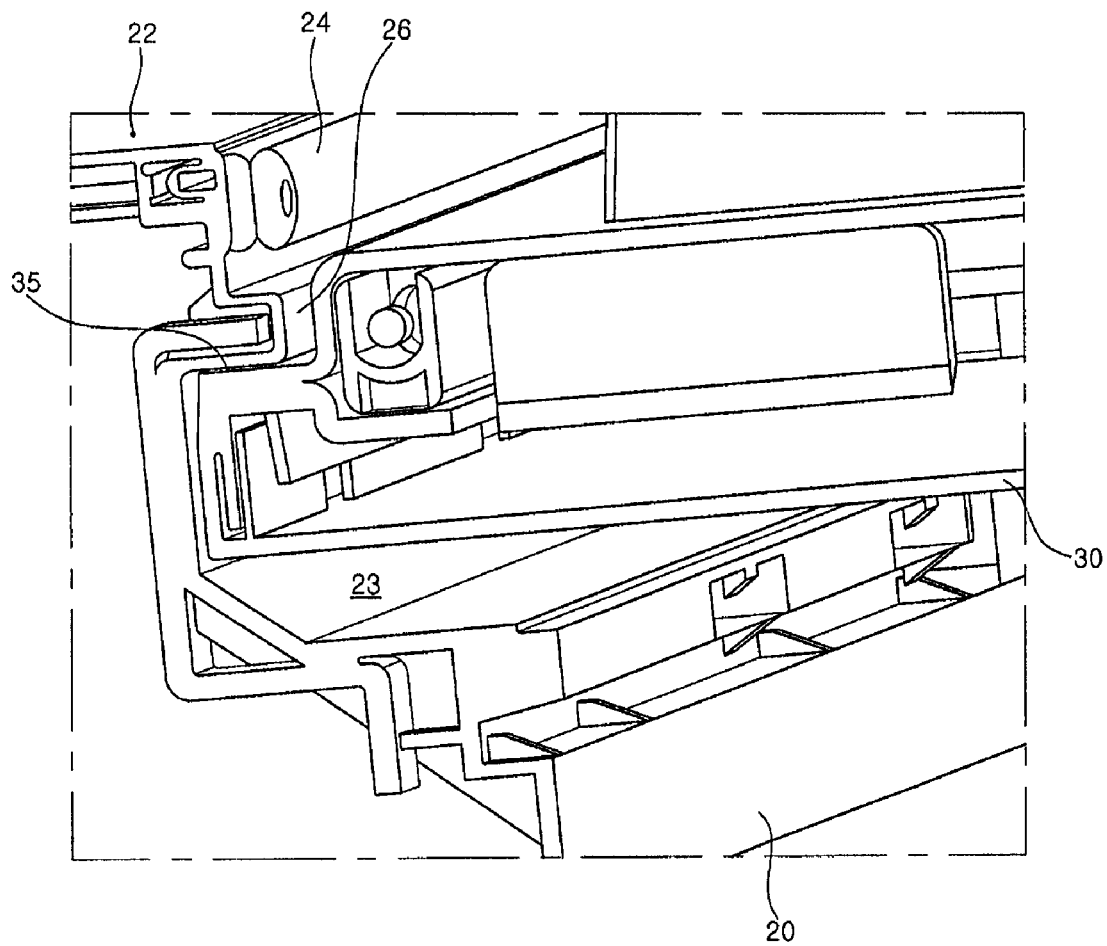

[Figure 9]
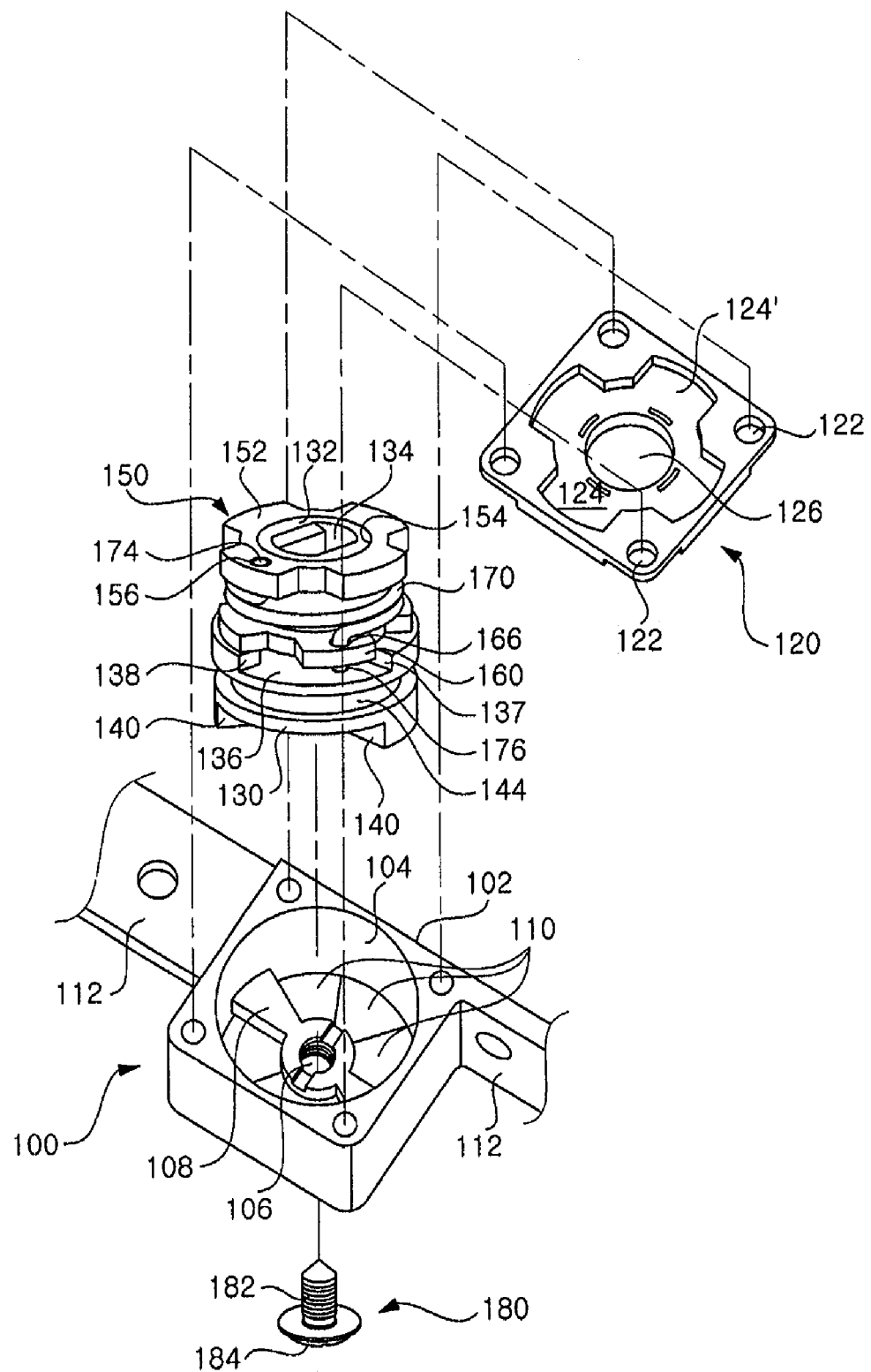

【Figure 10】
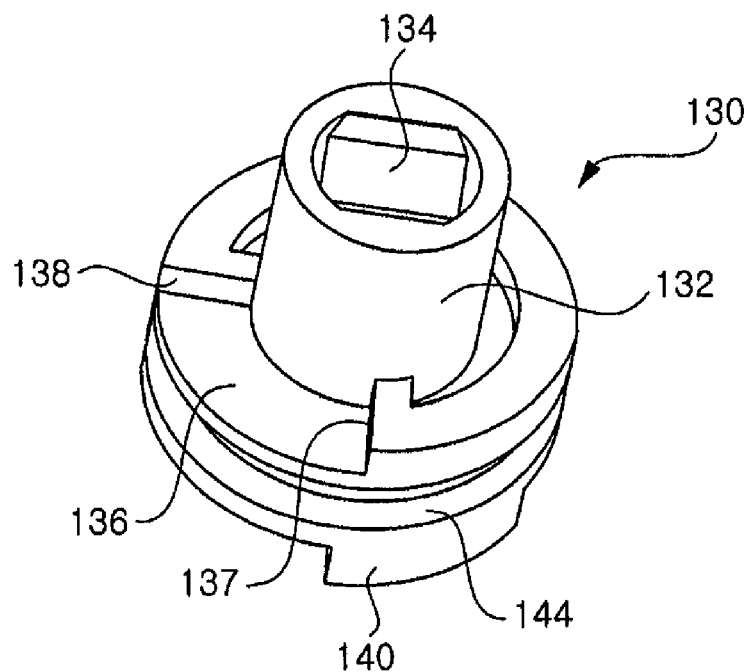
【Figure 11】
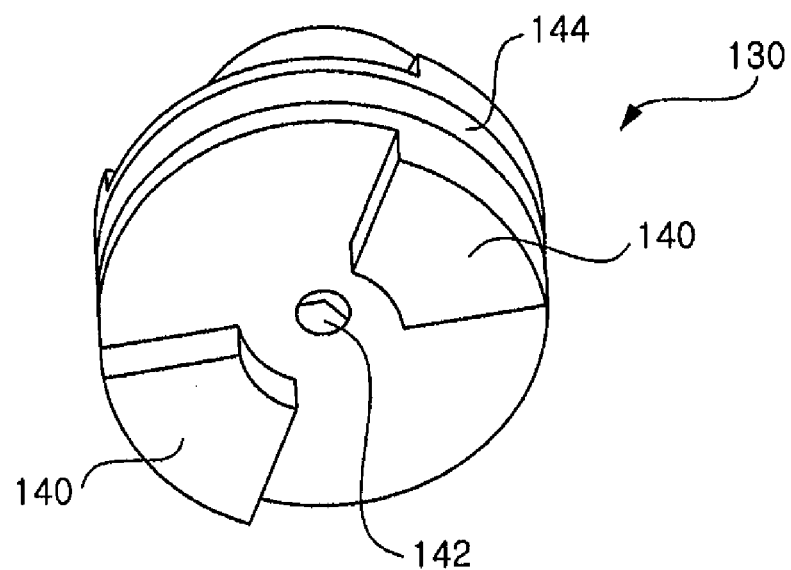

[Figure 12]
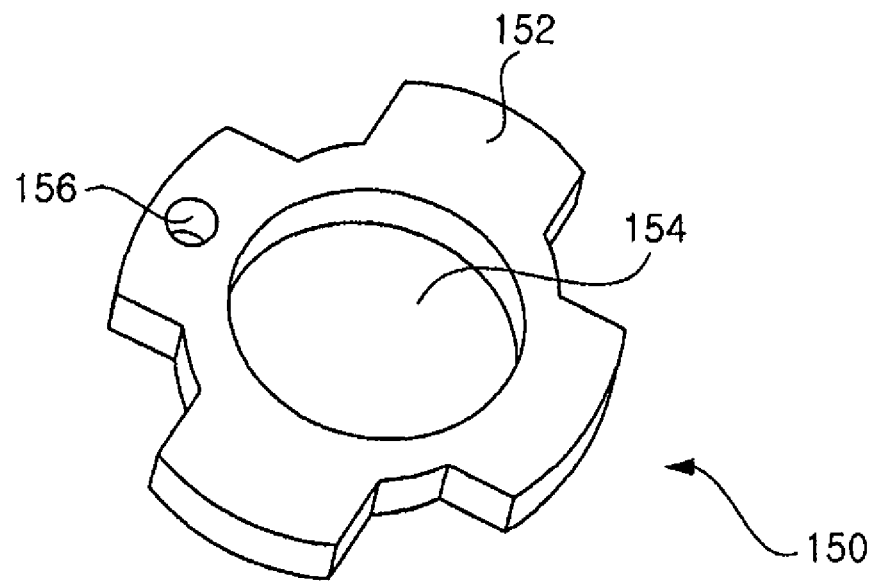
[Figure 13]
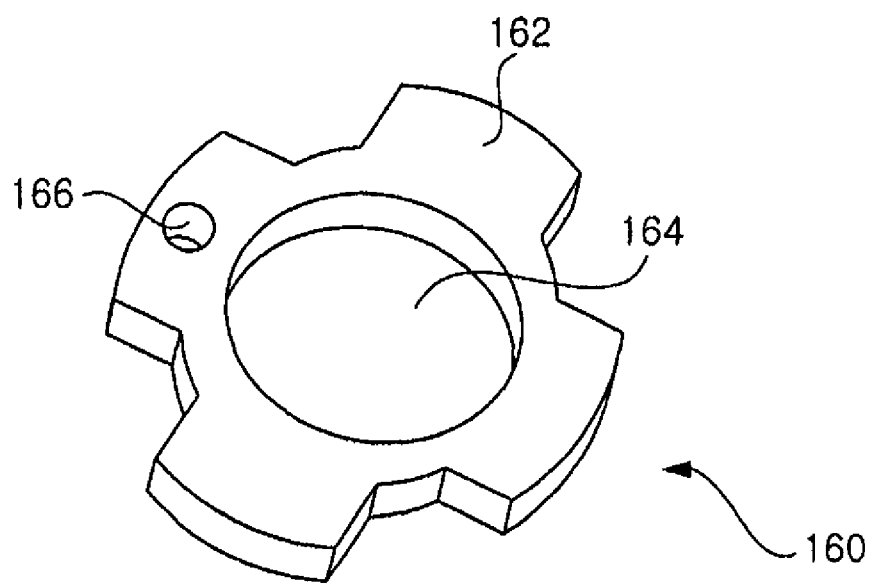

[Figure 14]
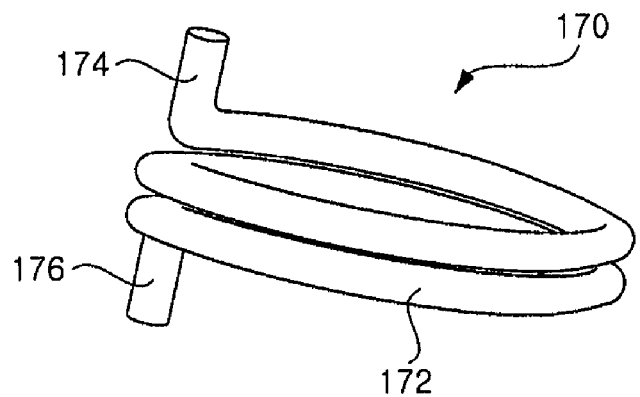
[Figure 15]
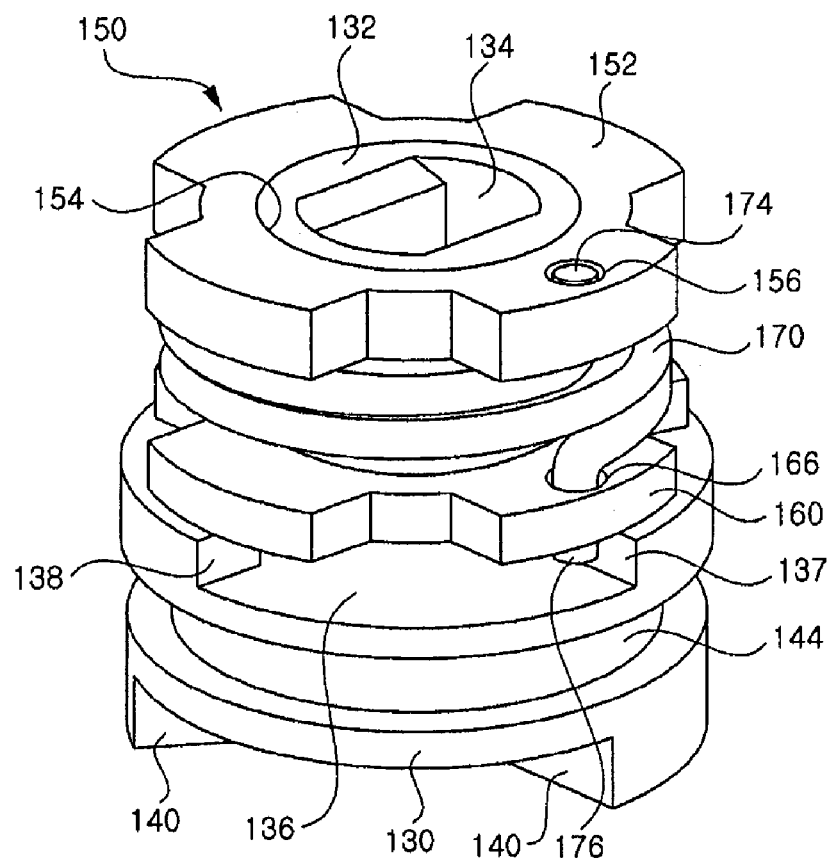

DAMPER AND HOME-BAR DOOR APPARATUS FOR REFRIGERATOR USING THE SAME

TECHNICAL FIELD

The present invention relates to a refrigerator, and more particularly, to a home-bar door apparatus for opening or closing a home bar that allows beverages or the like in a storage space to be taken in or out without opening a door of a refrigerator, and a dam per for use in the home-bar door apparatus.

BACKGROUND ART

FIG. 1 is a perspective view showing an appearance of a general refrigerator. According this figure, a storage space (not shown) is formed in a body 1 of the refrigerator The storage space is divided into a left freezing chamber and a right refrigerating chamber by a mullion (not shown) that is vertically placed to partition the interior of the body 1 at the center thereof.

The freezing chamber and the refrigerating chamber are opened or closed by doors 3 and 3', respectively. The doors 3 and 3' are pivotally supported by hinge assemblies 5 in upper and lower portions at both lateral ends of a front face of the body 1. Han dies 7 are also provided on the doors 3 and 3' to open or close the doors.

A home bar 10 is provided in the door 3' for opening or closing the refrigerating chamber. The home bar 10 allows a stored article to be taken in or out without opening the door 3'. Referring to the configuration of the home bar 10, a rectangular home-bar frame 12 is installed in an opening formed through the door 3'. A stored article can be taken in or out through a central opening of the home-bar frame 12. The opening is opened or closed by a home-bar door 14. Thus, the home-bar door 14 is formed to have a shape capable of being placed in the opening. Of course, an insulation layer is formed within the home-bar door 14.

An upper end of the home-bar door 14 is rotated downward by approximately 90 degrees about rotational shafts (not shown) provided at both ends of a lower portion so as to open the opening. In order to prevent the home-bar door 14 from being abruptly opened, a damper (not shown) may also be used.

However, the home-bar door apparatus of the convention refrigerator has the foil owing problems.

That is, the rotational shaft serving as the center of rotation of the home-bar door 14 generally protrudes from the damper, and the damper is installed inside the home-bar door 14. Thus, since the rotational shaft of the damper is installed in the home-bar frame 12 and thus entirely supports the load of the home-bar door 14, there is a problem in that the coupled state thereof may be released due to long-term use or opening/closing impact of the home-bar door 14.

In addition, in a case where the dampers are internally installed at the both ends of the lower portion of the home-bar door 14, a stopping structure is inevitably provided at a position corresponding to a center of the lower portion of the home-bar door 14 so that the home-bar door is supported by the home-bar frame 12 when the home-bar door 14 is opened. Therefore, the stopping structure is inevitably far from the both ends of the home-bar door 14, and thus, there is a problem in that the strength supporting the both ends of the home-bar door 14 is relatively weakened.

Moreover, in the prior art in which the rotational shaft serving as the center of rotation of the home-bar door 14 is constructed to protrude from the damper, there is a problem in that the entire damper should be replaced if the rotational shaft is damaged due to the load of the home-bar door 14.

In addition, the prior art has a problem in that when the home-bar door 14 is closed, initial opening of the home-bar door needs much force due to difference between external and internal pressure of the storage space and due to adhesion force between a gasket positioned at the back of the home-bar door 14 and a gasket positioned at the home-bar frame 12.

DISCLOSURE

Technical Problem

The present invention is conceived to solve the aforementioned problems. An object of the present invention is to provide a more secure installation state of a damper for smoothing an opening/closing operation of a home-bar door.

Another object of the present invention is to position stopping structures for regulating the degree of opening of a home-bar door at both ends of the home-bar door.

A further object of the present invention is to enhance durability and replaceability of components of a home-bar door apparatus.

A still further object of the present invention is to stably control an opening/closing speed of a home-bar door.

Technical Solution

According to an aspect of the present invention for achieving the object, there is provided a home-bar door apparatus for a refrigerator, comprising a home-bar frame installed to a door of the refrigerator and having an opening formed through a center thereof; a home-bar door provided for selectively opening or closing the opening and having rotational shafts as a center of rotation protruding from both ends of a lower portion thereof; dampers installed to a rear face of the home-bar frame to control an opening/closing speed of the home-bar door, the rotational shafts of the home-bar door being inserted into and relatively rotated with respect to the dampers; and damper brackets mounted together with the dampers to the rear face of the home-bar frame.

Preferably, damper mount plates are formed to extend at both ends of each of the dampers so that extension surfaces of the damper mount plates are orthogonal to each other.

Preferably, a close contact portion to be brought into contact with the rear face of the home-bar frame is provided in each of the damper brackets, and the close contact portion includes a first rear mount and a side mount that are fastened to the home-bar frame together with the damper mount plate.

Preferably, the damper bracket is further provided with a second rear mount mounted to the rear face of the home-bar frame.

Preferably, a stop rib having stopping steps at both ends thereof is formed to extend in a width direction at a relatively lower portion of a groove formed in the home-bar frame, and a catching step is formed at a lower end of the home-bar door in correspondence to the stop rib, thereby regulating the degree of opening when the home-bar door is completely opened.

Preferably, the damper includes: a damper body having a seating space formed therein; a cover plate mounted to one side of the damper body to shield the seating space and having a fixing recess formed in an inner surface thereof; a rotating part installed inside the seating space and rotated together with the rotational shaft of the home-bar door; an elastic member for exhibiting an elastic force in an initial opening stage and a last opening stage of the rotating part; a fixed guide plate fixed to the cover plate, one end of the elastic member being fixed to the fixed guide plate; and a movable guide plate installed to face the fixed guide plate with the elastic member interposed therebetween, the other end of the elastic member being fixed to the movable guide plate to selectively move together with the rotating part, wherein a damping fluid is filled in the seating space.

Preferably, the rotating part includes a shaft connection boss having a shaft insert ion portion to which the rotational shaft of the home-bar door is coupled, the shaft insert ion portion passing through the fixed guide plate, the movable guide plate and the elastic member.

Preferably, a cutout having first and second walls formed at both ends thereof by which a movable end of the elastic member is selectively caught is provided on a surface of the rotating part where the shaft connection boss is formed, so that the rotating part and the movable guide plate are moved integrally in a selective manner.

Preferably, the shaft insertion portion formed in the shaft connection boss of the rotating part is exposed outward through a through-hole formed through a center of the cover plate.

Preferably, at least one of the rotational shafts of the home-bar door protrudes and is supported by a spring in a direction in which the rotational shaft protrudes outside the home-bar door.

According to other aspect of the present invention for achieving the object, there is provided a damper, comprising a damper body formed with a seating space in which a damping fluid is filled; a cover plate mounted to one side of the damper body to shield the seating space and having a fixing recess formed in an inner surface thereof; a rotating part rotatably installed inside the seating space and having a shaft connection boss exposed outward through the cover plate; an elastic member for exhibiting an elastic force in an opening direction in an initial opening stage and in a closing direction in a last opening stage of the rotating part; a fixed guide plate fixed to the cover plate, one end of the elastic member being fixed to the fixed guide plate; and a movable guide plate installed to face the fixed guide plate with the elastic member interposed therebetween, the other end of the elastic member being fixed to the movable guide plate to selectively move tog ether with the rotating part.

Preferably, this invention further comprises damper mount plates provided on an outer surface of the damper body, wherein the damper mount plates extend from both ends of the damper body in opposite directions so that extension surfaces thereof are orthogonal to each other.

Preferably, a cutout having first and second walls formed at both ends thereof is provided on a surface of the rotating part where the shaft connection boss is formed, so that the other end of the elastic member can be selectively brought into contact with the first and second walls, whereby the rotating part and the movable guide plate are moved integrally in a selective manner.

Preferably, the shaft connection boss of the rotating part passes through centers of the fixed guide plate, the elastic member, the movable guide plate and the cover plate, and a shaft insertion portion is formed in the shaft connection boss.

Preferably, partition steps protrude from a bottom of the seating space of the damper body, cam surfaces are formed between the partition steps, and partition steps are provided on a surface of the rotating part corresponding to the cam surfaces, thereby causing a damping action by the damping fluid.

Preferably, each of the fixed guide plate and the movable guide plate has a boss passing hole at a center thereof, lobes protrude around a periphery of the boss passing hole, and a hole is formed through one of the lobes so that an end of the elastic member is caught in the hole.

Preferably, the elastic member comprises a torsion spring including a cylindrical body and fixed and movable ends provided at both ends of the cylindrical body to be caught in the holes of the fixed guide plate and the movable guide plate.

Preferably, an oil injection hole is formed in the damper body to communicate the seating space with the outside, and a fastening member is fastened to the oil injection hole to clog the oil injection hole.

Advantageous Effects

According to the present invention, the damper can be more securely installed at the home-bar frame, the stopping structures for regulating the degree of opening of the home-bar door are positioned at both ends of the home-bar door so as to more securely keep the center of rotation of the home-bar door, and an opening/closing speed of the home-bar door can be stably controlled.

In addition, the damper used for the home-bar door of the present invention facilitates to open the home-bar door at an initial opening stage, and also prevents the home-bar door from being abruptly opened at a last opening stage due to the weight of the home-bar door itself, thereby enhancing operational reliability of the home-bar door.

DESCRIPTION OF DRAWINGS

FIG. 1 is a perspective view showing an appearance of a refrigerator provided with a conventional home-bar door apparatus.

FIG. 2 is an exploded perspective view showing a home-bar door apparatus according to a preferred embodiment of the present invention.

FIG. 3 is a perspective view showing a rear side of a home-bar frame according to the embodiment of the present invention.

FIG. 4 is a sectional perspective view showing a stopping structure for regulating the degree of opening of the home-bar door in the embodiment of the present invention.

FIG. 5 is a perspective view showing a stopping step formed in the home-bar frame in the embodiment of the present invention.

FIGS. 6 and 7 are exploded perspective views showing a damper and a rotational shaft as the center of rotation of a home-bar door in the embodiment of the present invention.

FIG. 8 is a view showing an operating state where the degree of opening of the home-bar door is regulated by means of the stopping step in the embodiment of the present invention.

FIG. 9 is an exploded perspective view showing the damper in the embodiment of the present invention.

FIG. 10 is a top perspective view showing a rotating part of the damper of FIG. 9.

FIG. 11 is a bottom perspective view showing the rotating part of the damper of FIG. 9.

FIG. 12 is a perspective view showing a fixed guide plate of the damper of FIG. 9.

FIG. 13 is a perspective view showing a movable guide plate of the damper of FIG. 9.

FIG. 14 is a perspective view showing a spring of the damper of FIG. 9.

FIG. 15 shows an operating state of the damper of FIG. 9 when the home-bar door is closed.

BEST MODE

Referring to FIGS. 2 to 8, a home-bar frame 20 is made in the form of a substantially rectangular frame. The home-bar frame 20 is installed to be partially exposed on a front face of a refrigerator door. A rectangular opening 22 is formed at the center of the home-bar frame 20. A stored article is taken in or out through the opening 22. A groove 23 (see FIG. 4) depressed as compared with a front face of the home-bar frame 20 is formed along a periphery of the opening 22. The groove 23 is formed such that a front face of a home-bar door 30, which will be explained later, does not protrude beyond the front face of the home-bar frame 20 or a front face of an outdoor that defines the front face of the refrigerator door.

A gasket 24 is installed around the groove 23 that is positioned at the periphery of the opening 22. The gasket 24 is compressed to a rear face of the home-bar door 30, which will be explained later, to prevent leakage of cold air through the opening 22.

A stop rib 26 is formed along a portion of the groove 23 corresponding to a lower end of the home-bar frame 20, i.e., at a position spaced apart by a certain distance from a lower edge of the opening 22. The stop rib 26 linearly protrudes and laterally runs in the groove 23 of the home-bar frame 20. Stopping steps 27 are formed on bottom surfaces at both ends of the stop rib 26 as well shown in FIG. 5. The stopping steps 27 relatively more protrude than other portions and are portions with which a catching step 35 of the home-bar door 30, which will be explained later, comes into contact. The stopping steps 27 function to regulate the degree of opening of the home-bar door 30.

A periphery of the home-bar door 30 is seated in the groove 23 to open or close the opening 22. The home-bar door 30 has a shape corresponding to that of the opening 22, and thence a rectangular shape in this embodiment. An insulation layer is formed inside the home-bar door 30, similarly to the refrigerator door. A coupling hook 32 is provided at the center of an upper end of the rear face of the home-bar door 30. The coupling hook 32 is used for coupling the home-bar door 30 with the home-bar frame 20. A coupling recess 32' is formed in the groove 23 of the home-bar frame 20 to correspond to the coupling hook 32.

Rotational shafts 34 as the center of rotation are provided on both ends of a lower portion of the home-bar door 30. One of the rotational shafts 34 is well shown in FIGS. 6 and 7, and the rotational shaft 34 has a circular cross section and keying surfaces formed on its both ends. The shape of the rotational shaft 34 is to allow for relative rotation between the home-bar door 30 and a damper 36, which will be explained later. The rotational shafts 34 are provided on both sides of the home-bar door 30. One of the rotational shafts is supported in a direction in which it protrudes outside the home-bar door 30 by means of a spring. This is to facilitate assembly of the home-bar door 30 to the home-bar frame 20. The rotational shaft 34 is installed to protrude outwardly from the interior of the home-bar door 30 and to be exchangeable.

The catching step 35 having a relatively thin thickness is formed along the lower end of the home-bar door 30 as well shown in FIG. 4. The catching step 35 is caught by the stop rib 26 to regulate the degree of opening of the home-bar door 30.

The damper 36 is configured such that a rotating part 37 is relatively rotatably installed inside a damper body 36' defining an appearance of the damper. The damper body 36' includes a structure for disturbing rotation of the rotating part 37 so that the home-bar door 30 is relatively slowly rotated when being rotated together with the rotating part 37. This operation may be realized by filling a fluid in the damper body 36' and simultaneously using a certain mechanism.

A shaft insertion portion 37' having the same section as that of the rotational shaft 34 is formed in the rotating part 37. The rotational shaft 34 is inserted into the shaft insertion portion 37' so that the home-bar door 30 and the rotating part 37 are rotated integrally. Damper mount plates 38 are provided in the damper 36. The damper mount plates 38 function to fix the damper 36 to the home-bar frame 20. The damper mount plates 38 extend in opposite directions from both ends of the damper 36 such that extension surfaces of the damper mount plates are orthogonal to each other.

The damper 36 is coupled with the rotational shaft 34 through an opening portion formed in a sidewall of the groove 23 in a state where the damper is mounted on a rear face of the home-bar frame 20. The damper 36 is configured to regulate the degree of opening of the rotating part 37 with respect to the damper body 36'. That is, the rotating part 37 is configured to be rotated by about 89 degrees with respect to the damper body 36'. Of course, there may be an error of about ±1°.

A damper bracket 40 reinforces an installation state of the damper 36 installed at the home-bar frame 20. For this purpose, a close contact portion 41 is provided at the damper bracket 40. The close contact portion 41 is brought into close contact with the rear face of the home-bar frame 20. The close contact portion 41 is formed with a first rear mount 43 and a second rear mount 43'. The first and second rear mounts 43 and 43' are fastened to the rear face of the home-bar frame 20 by means of screws. The first and second rear mounts 43 and 43' are formed such that their extension surfaces are orthogonal to each other.

A side mount 45 is formed at a side adjacent to the first rear mount 43. The side mount 45 is mounted to one side surface of the home-bar frame 20. The surface of the side mount 45 and the surface of the first rear mount 43 are formed to be orthogonal to each other.

Hereinafter, the operation of the home-bar door apparatus for a refrigerator according to the present invention constructed as above will be described in detail.

In the present invention, the damper 36 is mounted to the rear face of the home-bar frame 20. That is, the damper 36 is fixed by coupling the damper mount plate 38 to a portion corresponding to the rear face of the groove 23 and the rear face of the home-bar frame 20.

The damper bracket 40 is installed to the rear face of the home-bar frame 20 with the damper 36 mounted thereto. The close contact portion 41 of the damper bracket 40 is brought into close contact with the rear face of the home-bar frame 20 (corresponding to the groove 23), and the first rear mount 43 is mounted to the rear face of the home-bar frame 20 together with one of the damper mount plates 38. The side mount 45 is coupled to the home-bar frame 20 together with the other damper mount plate 38. The second rear mount 43 is directly coupled to the home-bar frame 20.

In the state where the damper 36 is mounted to the home-bar frame 20 as mentioned above, the home-bar door 30 is mounted to the home-bar frame 20. At this time, the shaft insertion portion 37' of the damper 36 is exposed out through each of the opening portions at the both lower sides of the groove 23 in the home-bar frame 20. The rotational shaft 34 of the home-bar door 30 is inserted into the shaft insertion portion 37'. One of the rotational shafts 34 receives an elastic force to protrude out of the home-bar door 30 by means of a spring. Thus, while the rotational shaft 34 supported by the spring is pushed in by overcoming the elastic force of the spring, the other rotational central shaft 34 is inserted into the shaft insertion portion 37'. Then, the home-bar door 30 is moved to a position at which the rotational shaft 34 supported by the spring can be inserted into the corresponding shaft insertion portion 37'.

FIG. 4 shows a state where the home-bar door 30 is installed to the home-bar frame 20 and rotated about the rotational shafts 34 to close the opening 22. At this time, the rear face of the home-bar door 30 is brought into close contact with the gasket 24 to prevent leakage of cold air between the home-bar door 30 and the home-bar frame 20. The coupling hook 32 of the home-bar door 30 is seated in the coupling recess 32' of the home-bar frame 20 to keep the closed state of the home-bar door 30.

In such a state, when the coupling hook 32 is drawn out of the coupling recess 32' to open the home-bar door 30, the home-bar door 30 is rotated about the rotational shafts 34 due to a pulling force of a user or its own weight.

At this time, the damper 36 allows the home-bar door 30 not to be abruptly opened or closed. That is, since rotation of the rotating part 37 is disturbed by the damper body 36', the rotating part 37 is rotated at a relatively lower rate to control the opening/closing speed of the home-bar door 30.

Meanwhile, when the home-bar door 30 is completely opened, the catching step 35 of the home-bar door 30 is caught by the stop rib 26 of the home-bar frame 20. Of course, the degree of opening of the home-bar door 30 is regulated by the damper 36, but the stop rib 26 and the hook 35 also regulate the degree of opening of the home-bar door 30.

In particular, the catching step 35 is brought into contact with the stopping steps 27 formed at both ends of the stop rib 26 to regulate the degree of opening of the home-bar door 30. Thus, the home-bar door 30 can be more securely maintained in the opened state since the home-bar door 30 is supported at both ends of the home-bar door 30 by the stopping steps 27. Such a state is well shown in FIG. 8.

Mode for Invention

Now, an embodiment of the damper applicable to the home-bar door apparatus of the present invention will be described with reference to FIGS. 9 to 14.

A damper 100 of this embodiment includes a substantially hexahedral damper body 102. A seating space 104 with a cylindrical shape is formed inside the damper body 102. The seating space 104 is open at one side of the damper body 102. An oil injection hole 102 is formed through a side opposite to the opening of the seating space 104.

Female threads are formed on an inner surface of the oil injection hole 102.

Partition steps 108 protrude from a bottom of the seating space 104, and cam surfaces 110 with different slopes and heights are formed on the bottom between the partition steps 108. The partition steps 108 and the cam surfaces 110 are structures for a damping operation of oil.

Damper mount plates 112 are formed to extend in orthogonal directions on an outer surface of the damper body 102. The damper mount plates 112 are used for fixedly mounting the damper 100 at a specific position.

A cover plate 120 is mounted to one side of the damper body 102 so as to shield the seating space 104. The cover plate 120 can be considered to substantially constitute a part of the damper body 102. The cover plate 120 has fastening holes 122 formed at four corners so that screws may be fastened to fastening holes (without reference numerals) of the damper body 102. A fixing recess 124 is concavely formed in one side of the cover plate 120, i.e., a side facing the seating space 104.

A plurality of lobe seating portions 124' are formed along a periphery of the fixing recess 124. A through-hole 126 is formed through the center of the cover plate 120. The through-hole 126 is a portion through which a shaft connection boss 132 of a rotating part 130, which will be explained later, is exposed out of the damper body 102.

As well shown in FIGS. 10 and 11, the rotating part 130 has a substantially cylindrical shape. The rotating part 130 is installed to be rotated through a predetermined angle inside the seating space 104. The shaft connection boss 132 is provided to the rotating part 130 to extend in a direction of the rotational shaft. The shaft connection boss 132 has a shaft insertion portion 134 formed therein with a substantially cylindrical shape. The shaft insertion portion 134 has a corresponding shape such that a rotational shaft provided to the damper door is not relatively rotated but integrally rotated together. That is, the shaft insertion portion 134 has a key surface to be brought into close contact with the key surface of the rotational shaft.

A cutout 136 is formed around a periphery of the surface of the rotating part 130 where the shaft connection boss 132 protrudes. As the cutout 136 is formed, a first wall 137 and a second wall 138 are formed at both ends of the cutout. The first and second walls 137 and 138 function to limit a stroke through which a movable end 176 of an elastic member 170, which will be explained later, is moved.

A partition step 140 is formed at a side of the rotating part 130 opposite to the cutout 136, as well shown in FIG. 11. The partition step 140 corresponds to the partition step 108 formed on the bottom of the seating space 104 of the damper body 102, and is placed at a position corresponding to the cam surfaces 110. Reference numeral 142 designates a fastening recess, and 144 designates an oil groove.

A fixed guide plate 150 is installed such that the shaft connection boss 132 of the rotating part 130 passes through the center thereof. The fixed guide plate 150 is positioned at the fixing recess 124 of the cover plate 120 while being relatively rotatable with respect to the rotating part 130. A plurality of fixing lobes 152 are formed along a periphery of the fixed guide plate 150. The fixing lobes 152 are positioned in the lobe seating portions 124' of the fixing recess 124 so that the fixed guide plate 150 is not relatively rotated with respect to the cover plate 120.

A boss passing hole 154 is formed through the center of the fixed guide plate 150 so that the shaft connection boss 132 of the rotating part 130 passes through the boss passing hole. The shapes and dimensions of the inner surface of the boss passing hole 154 and the outer surface of the shaft connection boss 132 are designed so that the shaft connection boss 132 of the rotating part 130 can be relatively rotatably inserted into the boss passing hole 154. A hole 156 is formed in one side of the fixed guide plate 150, and a fixed end 174 of the elastic member 170, which will be explained later, is inserted and fixed in the hole 156.

A movable guide plate 160 is installed to the fixed guide plate 150 with the elastic member 170, which will be explained later, interposed therebetween. The movable guide plate 160 is made with the same shape as the fixed guide plate 150, but not limited thereto.

The movable guide plate 160 is a portion by which the movable end 176 of the elastic member 170 is caught, so that the elastic member 170 can smoothly operate in cooperation with the fixed guide plate 150. A plurality of protruding lobes 162 are formed along a periphery of the movable guide plate 160. However, the protruding lobes 162 are not necessarily provided at the movable guide plate 160.

A boss passing hole 164 is formed through the center of the movable guide plate 160. The shaft connection boss 132 is relatively rotatably installed through the boss passing hole 164. A hole 166 is formed through one side of the movable guide plate 160.

The movable end 176 of the elastic member 170, which will be explained later, is inserted and caught in the hole 166.

The fixed guide plate 150 and the movable guide plate 160 have the identical con figuration. This is to minimize the number of parts by using the parts with the same configuration.

The elastic member 170 includes a cylindrical body 172 with the fixed end 174 and the movable end 176 formed at both ends. The cylindrical body 172 is positioned between the guide plates 150 and 160, and the fixed end 174 and the movable end 176 are respectively caught in the holes 156 and 166 of the guide plates 150 and 160. The elastic member 170 is a kind of torsion spring. The elastic member 170 exhibits an elastic force in a direction in which the home-bar door is opened in an initial opening stage, and functions to prevent the home-bar door from being abruptly closed in a last opening stage.

Then, a fastening member 180 is fastened to the oil injection hole 106 of the damper body 102, and positioned in the fastening recess 142 of the rotating part 130. This fastening member 180 has a body 182 with male threads formed on an outer peripheral surface thereof, and a head 184 with a relatively larger diameter is provided at one end of the body 182. The body 182 is fastened to the oil injection hole 106 and then inserted into the fastening recess 142, and the head 184 functions to clog the oil injection hole 106.

In addition, a damping fluid with high viscosity is filled in the seating space 104 of the damper body 102. The damping fluid disturbs the rotation of the rotating part 130 within the seating space 104, thereby preventing the home-bar door from being abruptly opened.

Hereinafter, the operation of the damper according to the present invention constructed as above will be explained.

The damper ensures that the home-bar door is smoothly opened at an initial opening stage of the home-bar door due to the restoring force of the elastic member 170, and also prevents the home-bar door from being abruptly opened due to its weight during the last opening stage of the home-bar door by means of the damping force of the damping fluid and the elastic force of the elastic member 170.

That is, FIG. 15 shows the relative positions of the rotating part 130 and the movable end 176 of the elastic member 170 in a state where the home-bar door is closed. This state will be explained in comparison with the state of FIG. 9. FIG. 9 shows that the home-bar door is opened by approximately a half. In this state, the rotating part 130 is rotated together with the home-bar door so that the movable end 176 is brought into con tact with the first wall 137. When the rotating part 130 continues to be rotated in a state where the movable end 176 is in contact with the first wall 137, the elastic member 170 is elastically deformed and thus has a restoring force.

In the state of FIG. 15 where the home-bar door is closed, the rotating part 130 ha been further rotated after the movable end 176 is in contact with the first wall 137. Thus, the rotating part has a restoring force. Thus, the home-bar door receives the restoring force to some extent in a direction in which the home-bar door is intended to be opened from a closed state. However, since the fastening hook is caught in the fastening recess, the home-bar door is not opened arbitrarily. Of course, an adhesion force between the gaskets also works to some extent.

In this state, if the coupling between the fastening hook and the fastening recess is released, the home-bar door is rotated in an opening direction due to the elastic restoring force of the elastic member 170 of the damper 100.

In addition, if the rotating part 130 continues to be rotated together with the home-bar door, the movable end 176 is separated from the first wall 137. In the state where the movable end 176 of the elastic member 170 is separated from the first wall 137, the rotation of the rotating part 130 is disturbed by the damping force of the damping fluid. Thus, the opening speed of the home-bar door is controlled to some extent.

Meanwhile, the rotating part 130 continues to be rotated by the home-bar door, the movable end 176 comes into contact with the second wall 138. Of course, if the home-bar door is designed to be opened such that the movable end 176 does not come into contact with the second wall 138, the opening operation of the home-bar door ends at that moment. However, if the home-bar door is opened until the movable end 176 comes into contact with the second wall 138, the movable end 176 is brought into contact with the second wall 138. If the home-bar door is intended to be further opened, the elastic member 170 is elastically deformed to relatively lower the opening speed of the home-bar door.

Whether the movable end 176 comes into contact with the second wall 138 depends on the dimension of the width of the cutout 136. That is, if the width of the cutout 136 is determined to be greater than an angle at which the home-bar door is opened, the movable end 176 may not come into contact with the second wall 138 even though the home-bar door is completely opened.

Meanwhile, the fixed guide plate 150 and the movable guide plate 160 provided at the both ends of the cylindrical body 172 of the elastic member 170 function to guide the cylindrical body 172 while the elastic member 170 is operated, and also prevents noise generation and any interference between the elastic member 170 and other parts.

For reference, among the rotating part 130, the movable guide plate 160, the elastic member 170 and the fixed guide plate 150, which are installed in the damper body 102, the fixed guide plate 150 is fixed to the damper body 102, more specifically to the cover plate 120 so that it cannot be moved. However, the rotating part 130 is rotated together with the home-bar door, and the movable guide plate 160 is rotated together with the rotating part 130 if the movable end 176 of the elastic member 170 is brought into contact with the first or second wall 137 or 138.

The scope of the present invention is not limited to the aforementioned embodiment but defined by the appended claims, and it will be apparent that those skilled in the art can make various changes and modifications within the scope of the invention defined by the claims.

INDUSTRIAL APPLICABILITY

As described above, the damper and the home-bar door using the damper according to the present invention can be installed to a door of a refrigerator. When such a home-bar door is used, it is possible to take in or out an article into or from a storing space of the refrigerator without opening the refrigerator door, and the use of the damper can prevent abrupt opening of the home-bar door or any difficulty during an initial opening stage.

The invention claimed is:

1. A home-bar door apparatus for a refrigerator, comprising:
   a home-bar frame installable to a door of the refrigerator and having an opening formed through a center thereof;
   a home-bar door provided for selectively opening or closing the opening and having rotational shafts as a center of rotation protruding from both ends of a lower portion thereof;
   dampers installed to a rear face of the home-bar frame to control an opening/closing speed of the home-bar door, the rotational shafts of the home-bar door being inserted into and relatively rotated with respect to the dampers; and
   damper brackets mounted together with the dampers to the rear face of the home-bar frame
   wherein damper mount plates are formed to extend at both ends of each of the dampers so that extension surfaces of the damper mount plates are orthogonal to each other.

2. The apparatus as claimed in claim 1, wherein a close contact portion to be brought into contact with the rear face of the home-bar frame is provided in each of the damper brackets, and the close contact portion includes a first rear mount and a side mount that are fastened to the home-bar frame together with the damper mount plate.

3. The apparatus as claimed in claim 2, wherein the damper bracket is further provided with a second rear mount mounted to the rear face of the home-bar frame.

4. The apparatus as claimed in claim 1, wherein a stop rib having stopping steps at both ends thereof is formed to extend in a width direction at a relatively lower portion of a groove formed in the home-bar frame, and a catching step is formed at a lower end of the home-bar door in correspondence to the stop rib, thereby regulating the degree of opening when the home-bar door is completely opened.

5. The apparatus as claimed in claim 1, wherein the damper includes:
   a damper body having a seating space formed therein;
   a cover plate mounted to one side of the damper body to shield the seating space and having a fixing recess formed in an inner surface thereof;
   a rotating part installed inside the seating space and rotated together with the rotational shaft of the home-bar door;
   an elastic member for exhibiting an elastic force in an initial opening stage and a last opening stage of the rotating part;
   a fixed guide plate fixed to the cover plate, one end of the elastic member being fixed to the fixed guide plate; and
   a movable guide plate installed to face the fixed guide plate with the elastic member interposed therebetween, the other end of the elastic member being fixed to the movable guide plate to selectively move together with the rotating part,
   wherein a damping fluid is filled in the seating space.

6. The apparatus as claimed in claim 5, wherein the rotating part includes a shaft connection boss having a shaft insertion portion to which the rotational shaft of the home-bar door is coupled, the shaft insertion portion passing through the fixed guide plate, the movable guide plate and the elastic member.

7. The apparatus as claimed in claim 6, wherein a cutout having first and second walls formed at both ends thereof by which a movable end of the elastic member is selectively caught is provided on a surface of the rotating part where the shaft connection boss is formed, so that the rotating part and the movable guide plate are moved integrally in a selective manner.

8. The apparatus as claimed in claim 7, wherein the shaft insertion portion formed in the shaft connection boss of the rotating part is exposed outward through a through-hole formed through a center of the cover plate.

9. The apparatus as claimed in claim 1, wherein at least one of the rotational shafts of the home-bar door protrudes and is supported by a spring in a direction in which the rotational shaft protrudes outside the home-bar door.

10. A damper, comprising:
    a damper body formed with a seating space in which a damping fluid is filled;
    a cover plate mounted to one side of the damper body to shield the seating space and having a fixing recess formed in an inner surface thereof;
    a rotating part rotatably installed inside the seating space and having a shaft connection boss exposed outward through the cover plate;
    an elastic member for exhibiting an elastic force in an opening direction in an initial opening stage and in a closing direction in a last opening stage of the rotating part;
    a fixed guide plate fixed to the cover plate, one end of the elastic member being fixed to the fixed guide plate; and
    a movable guide plate installed to face the fixed guide plate with the elastic member interposed therebetween, the other end of the elastic member being fixed to the movable guide plate to selectively move together with the rotating part.

11. The damper as claimed in claim 10, further comprising damper mount plates provided on an outer surface of the damper body, wherein the damper mount plates extend from both ends of the damper body in opposite directions so that extension surfaces thereof are orthogonal to each other.

12. The damper as claimed in claim 10, wherein a cutout having first and second walls formed at both ends thereof is provided on a surface of the rotating part where the shaft connection boss is formed, so that the other end of the elastic member can be selectively brought into contact with the first and second walls, whereby the rotating part and the movable guide plate are moved integrally in a selective manner.

13. The damper as claimed in claim 12, wherein the shaft connection boss of the rotating part passes through centers of the fixed guide plate, the elastic member, the movable guide plate and the cover plate, and a shaft insertion portion is formed in the shaft connection boss.

14. The damper as claimed in claim 10, wherein partition steps protrude from a bottom of the seating space of the damper body, cam surfaces are formed between the partition steps, and partition steps are provided on a surface of the rotating part corresponding to the cam surfaces, thereby causing a damping action by the damping fluid.

15. The damper as claimed in claim 10, wherein each of the fixed guide plate and the movable guide plate has a boss passing hole at a center thereof, lobes protrude around a periphery of the boss passing hole, and a hole is formed through one of the lobes so that an end of the elastic member is caught in the hole.

16. The damper as claimed in claim 15, wherein the elastic member comprises a torsion spring including a cylindrical body and fixed and movable ends provided at both ends of the cylindrical body to be caught in the holes of the fixed guide plate and the movable guide plate.

17. The damper as claimed in claim 16, wherein an oil injection hole is formed in the damper body to communicate the seating space with the outside, and a fastening member is fastened to the oil injection hole to clog the oil injection hole.

* * * * *